Sept. 4, 1923.

R. H. BUTTERS

GIN OR LINTER SAW

Original Filed Aug. 15, 1921

1,466,927

Robert H. Butters
Inventor

By John S. Powers
Attorney

Patented Sept. 4, 1923.

1,466,927

UNITED STATES PATENT OFFICE.

ROBERT H. BUTTERS, OF ATLANTA, GEORGIA, ASSIGNOR TO THE BUTTERS-CAMP MANUFACTURING COMPANY, OF ATLANTA, GEORGIA, A CORPORATION OF GEORGIA.

GIN OR LINTER SAW.

Application filed August 15, 1921, Serial No. 492,505. Renewed February 15, 1923.

*To all whom it may concern:*

Be it known that I, ROBERT H. BUTTERS, a citizen of the United States, residing at Atlanta, in the county of Fulton and State of Georgia, have invented certain new and useful Improvements in Gin or Linter Saws, of which the following is a specification.

This invention relates to an improvement in gin or linter saws and more particularly to the teeth of such saws.

The principal object of the invention is to provide teeth which shall be especially adapted for the linting operation, that is to say teeth which will recover in maximum degree only the longer fibres adhering to the seed and will reject those short and discolored fibres which impair the quality and reduce the value of the lint; it is also an object to provide teeth which may be finely cut, for example three hundred or upwards per saw of standard diameter, yet which will be of great strength and sturdiness, adapted to withstand the high speeds at which linter saws are driven without breakage or without bending laterally or in the plane of the saw and which will be adapted to initial formation as well as repeated renewal by the advantageous method and machine set forth in my prior Patents, Nos. 1,277,375 and 1,329,036 in connection with a cutter of appropriate form.

With the above objects in view the invention consists generally in a tooth which is devoid of sharp lateral edges such as will exercise a cutting effect on the short fibres and which is provided with a sturdy and relatively short actual point reinforced above and below and at the sides and having a sharp terminal apex, said point being thereby adapted to act in the most effective manner in selecting only the longer fibres and loosening and pulling them from the seed.

The accompanying drawing illustrates saw teeth in accordance with the invention, the saws and the teeth being greatly exaggerated to promote clearness of illustration.

Figure 1:
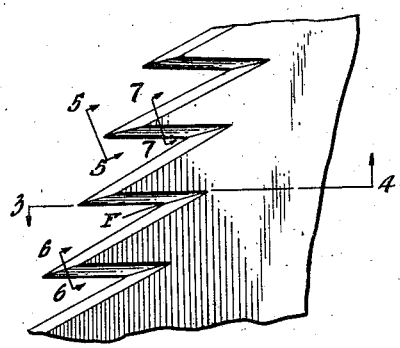
Figure 1 is a fragmentary side elevation of a saw showing several successive teeth thereof.
Figure 2:
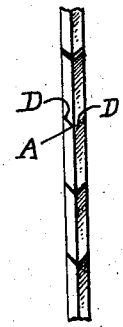
Figure 2 is a fragmentary front elevation of the saw.
Figure 3:
Figure 3 is a normal plan view projected in the plane 3—4 of Figure 1.
Figure 4:
Figure 4 is a bottom plan view projected in the plane 3—4 of Figure 1.
Figure 5:
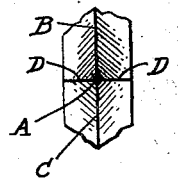
Figure 5 is a detail front elevation of one of the teeth viewed from the plane 5—5 of Figure 1.
Figure 6:
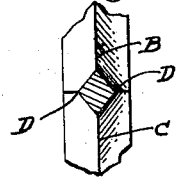
Figure 7:
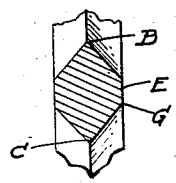

Figures 6 and 7 are sectional views on the lines 6—6 and 7—7 respectively of Figure 1.

Figure 8:
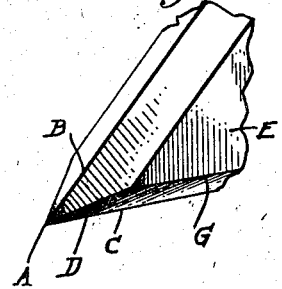

Figure 8 is a larger scale detail of a tooth.

In accordance with the invention the actual point of the tooth is pyramidal having a diamond shaped cross section, and tapers to a sharp terminal apex A. The pyramidal point is provided on its upper face with a central longitudinal rib B, on its under face with a central longitudinal rib C and along its sides with longitudinal ribs D, all of which ribs meet at the apex A. The body portion of the tooth has flat sides E of triangular outline and in the same planes as the sides of the saw; thereby the tooth has a close and advantageous fit between the bars of the usual linter grid. The ribs B and C are preferably continued to the throats F of adjacent teeth and the ribs D extend from the apices of the sides E to the terminal apex A.

By virtue of the ribs C the under face of each tooth is of convex V-form and thereby the edges G formed by the meeting of the inclined sides of the under face with the sides E are entirely devoid of sharpness and cutting qualities. This is also true of the lateral ribs D which are produced by the meeting of the inclined sides of the under face with the inclined sides of the upper face.

The actual point is strongly reinforced in all directions in which breaking, bending or distortion can take place by the ribs B, C and D and also has its strength and sturdiness promoted by its relative shortness; moreover a sharp terminal apex is produced while at the same time sharp lateral edges are eliminated throughout the extent of the tooth. By virtue of these several features the tooth is not only admirably adapted to the wearing and tearing work of linter gins in point of wearing qualities but also produces lint of a superior grade, that is to say composed of only the longer and better fibres adhering to the seed and without any content of short or discolored fibres or fine seed particles, this for the reason that the tooth acts with only loosening and pulling effect and entirely without cutting effect.

In other respects the improved tooth has the structural characteristics and advantages of the tooth set forth in my prior Patent No. 1,346,396, that is to say the advantages of a close working fit between the bars of the linter grid, of having its body portion of the same thickness as the saw with resultant increase of strength as compared with teeth which taper from throat to base and of having its throat of convex V-form with resultant reinforcing effect.

Having fully described my invention, I claim:

1. A linter saw whose teeth have each a pyramidal point of diamond-shaped cross section tapering to a sharp terminal apex and having longitudinal reinforcing ribs along its upper, under and lateral faces, the lateral ribs being devoid of cutting qualities.

2. A linter saw whose teeth have each side faces and a pyramidal point of diamond-shaped cross section tapering to a sharp terminal apex and having longitudinal reinforcing ribs along its upper, under and lateral faces, the lateral ribs being devoid of cutting qualities and the upper and under ribs being continued to the throat of adjacent teeth, the lateral edges formed by the meeting of the inclined sides of the under face with the side faces of the tooth being also devoid of cutting qualities.

In testimony whereof I affix my signature.

ROBERT H. BUTTERS.